(12) United States Patent
Cheng

(10) Patent No.: US 10,500,689 B2
(45) Date of Patent: Dec. 10, 2019

(54) METAL CHIP CONVEYOR HAVING INTERNAL CHIP REMOVAL STRUCTURE

(71) Applicant: FONGEI INDUSTRY CO., LTD., Taichung (TW)

(72) Inventor: Chih Peng Cheng, Taichung (TW)

(73) Assignee: Fongei Industry Co., Ltd., Taichung (TW)

( * ) Notice: Subject to any disclaimer, the term of this patent is extended or adjusted under 35 U.S.C. 154(b) by 0 days.

(21) Appl. No.: 16/503,831

(22) Filed: Jul. 5, 2019

(65) Prior Publication Data

US 2019/0329371 A1 Oct. 31, 2019

Related U.S. Application Data

(63) Continuation-in-part of application No. 15/980,924, filed on May 16, 2018, now Pat. No. 10,427,261.

(30) Foreign Application Priority Data

Jan. 12, 2018 (TW) .............................. 107200576 U

(51) Int. Cl.
*B23Q 11/00* (2006.01)
*B65G 17/30* (2006.01)
(Continued)

(52) U.S. Cl.
CPC ........ *B23Q 11/0057* (2013.01); *B65G 17/067* (2013.01); *B65G 17/30* (2013.01);
(Continued)

(58) Field of Classification Search
CPC .... B23Q 11/0057; B65G 15/60; B65G 15/62; B65G 17/067; B65G 17/30; B65G 21/06;
(Continued)

(56) References Cited

U.S. PATENT DOCUMENTS 5,069,327 A * 12/1991 Stohr ..................... B65G 19/28
198/494
6,332,983 B1 * 12/2001 Tashiro .............. B23Q 11/0057
210/295

(Continued)

FOREIGN PATENT DOCUMENTS

JP 2001253523 A * 9/2001

*Primary Examiner* — Gene O Crawford
*Assistant Examiner* — Keith R Campbell
(74) *Attorney, Agent, or Firm* — Rosenberg, Klein & Lee

(57) ABSTRACT

A metal chip conveyor having an internal chip removal structure includes an endless conveyor belt. An accommodating room of a machine body is divided into an inner space and an outer space. Two sides of the conveyor belt assemble with chains each having chain links. Each chain link has a first opening facing the inner space and a second opening facing the outer space. A guiding block is arranged in the inner space. The guiding block has a bottom surface, a blocking face, and a guiding gap. The bottom surface faces to the conveyor belt. The guiding gap lies at one side of the blocking face and communicates with the chain links. Therefore, metal chips are stopped by the blocking face and are moved to the guiding gap, then drop to the outer space via the chain links.

10 Claims, 8 Drawing Sheets

(51) Int. Cl.
*B65G 21/10* (2006.01)
*B65G 21/22* (2006.01)
*B65G 17/06* (2006.01)
*B65G 23/04* (2006.01)

(52) U.S. Cl.
CPC ........... *B65G 21/105* (2013.01); *B65G 21/22* (2013.01); *B65G 23/04* (2013.01); *B65G 2201/04* (2013.01); *B65G 2812/0295* (2013.01)

(58) Field of Classification Search
CPC ...... B65G 21/105; B65G 21/22; B65G 23/04; B65G 23/44; B65G 2201/04; B65G 2812/0295
USPC .................................. 198/841, 860.3, 860.4
See application file for complete search history.

(56) References Cited

U.S. PATENT DOCUMENTS

| | | | | |
|---|---|---|---|---|
| 6,478,143 B1* | 11/2002 | Enomoto | ............. | B65G 17/064 198/735.1 |
| 6,511,597 B2* | 1/2003 | Hori | .................. | B23Q 11/0057 210/298 |
| 7,364,652 B2* | 4/2008 | Middleton | ........... | B01D 33/333 210/158 |
| 9,272,380 B2* | 3/2016 | Nishiki | .............. | B23Q 11/0057 |

* cited by examiner

METAL CHIP CONVEYOR HAVING INTERNAL CHIP REMOVAL STRUCTURE

REFERENCE TO RELATED APPLICATIONS

This is being filed as a Continuation-in-Part of patent application Ser. No. 15/980,924, filed 16 May 2018, currently pending.

FIELD OF THE INVENTION

The present invention relates to a chip conveyor, and more particularly to a chip conveyor having a filtering device.

BACKGROUND OF THE INVENTION

As shown in FIG. 8, a conventional metal chip conveyor has a conveyor belt 6 for conveying metal chips. Both sides of the conveyor belt 6 are provided with a pair of chains 61. Each chain 61 has a plurality of chain links 62. The rear end of the conveyor belt is provided with sprockets 7 to mesh with chain links 62 of the chains 61 for rolling the conveyor belt 6.

An inner space 63 is enclosed by the conveyor belt 6. The inner space 63 communicates with the outside via the chain links 62 of the chain 61. A portion of metal chips dropped on the conveyor belt 6 will fall into the inner space 63 and further fill the chain links 62. During the process of rolling the conveyor belt 6 by the sprockets 7, when the teeth 71 of the sprockets 7 are inserted into the chain links 62, the metal chips are compacted into blocks to clog the chain links 62. After a period of time, the chain links 62 are clogged with the metal chips. As a result, it is difficult for the sprockets 7 to accurately mesh with the chains 61, which impairs the normal operation of the conveyor belt 6.

On the other hand, after the metal chip conveyor is used for a period of time, the blocky metal chips will accumulate at the tail end of the machine body and must be periodically cleaned to maintain the normal operation. However, the casing 8 at the rear end of the machine body is usually welded and cannot be partially removed. Therefore, the conveyor belt 6 must be dismantled first, and the cleaning is performed in the limited space. The cleaning is inconvenient, time-consuming and labor-consuming.

SUMMARY OF THE INVENTION

The primary object of the present invention is to provide a metal chip conveyor having an internal chip removal structure. It uses a cylindrical bush instead of a sprocket, and uses its cylinder wall to cover the chain links of the chains in the inner space enclosed by the conveyor belt, thereby preventing the metal chips in the chain links from falling back into the inner space and ensuring that the metal chips in the inner space to be discharged stably so as to maintain the normal operation of the metal chip conveyor.

In order to achieve the above object, the present invention provides a metal chip conveyor having an internal chip removal structure, comprising a machine body, an endless conveyor belt, and two support bushes. The machine body has a casing. An accommodating room is enclosed by the casing. The endless conveyor belt is disposed in the accommodating room and driven by a drive device. The accommodating room defines an inner space enclosed by the conveyor belt and an outer space outside the conveyor belt. Two sides of the conveyor belt are provided with a pair of chains each having a plurality of chain links. The chain links each has a first opening facing the inner space and a second opening facing the outer space. The two support bushes are disposed at opposite sides of the casing and extend toward the accommodating room. The conveyor belt passes around the two support bushes and is supported by the two support bushes. The support bushes cover the first openings of the chain links corresponding in position to the support bushes when the conveyor belt is running. A rear end of the casing furtherly extends a gathering space communicating with the outer space.

A guiding block is arranged in the inner space. The guiding block has a bottom surface, a blocking face, and a guiding gap. The bottom surface faces to the conveyor belt. The guiding gap lies at least one side of the blocking face and communicates with the chain links. At least one end of the guiding block is connected to the casing. The blocking face is vertical to the bottom surface. At least one corner of the guiding block is inclined sliced off for forming the guiding gap. The bottom surface is closely bordered to the conveyor belt. Therefore, metal chips are stopped by the blocking face and are moved to the guiding gap, then drop to the outer space via the chain links, prevent the metal chips from accumulating in the inner space.

In an embodiment, the opposite sides of the casing are provided with two detachable cover plates. The two support bushes are disposed on the two cover plates, respectively.

In an embodiment, the support bushes each has a guide section to hold against the conveyor belt. The guide section covers the first openings of the chain links corresponding in position to the guide section.

In an embodiment, the guide section has a curved contact surface to hold against the conveyor belt.

In an embodiment, the conveyor belt is provided with a plurality of spaced crossbars extending outward toward the outer space.

DETAILED DESCRIPTION OF THE PREFERRED EMBODIMENTS

Embodiments of the present invention will now be described, by way of example only, with reference to the accompanying drawings.

Figure 1:
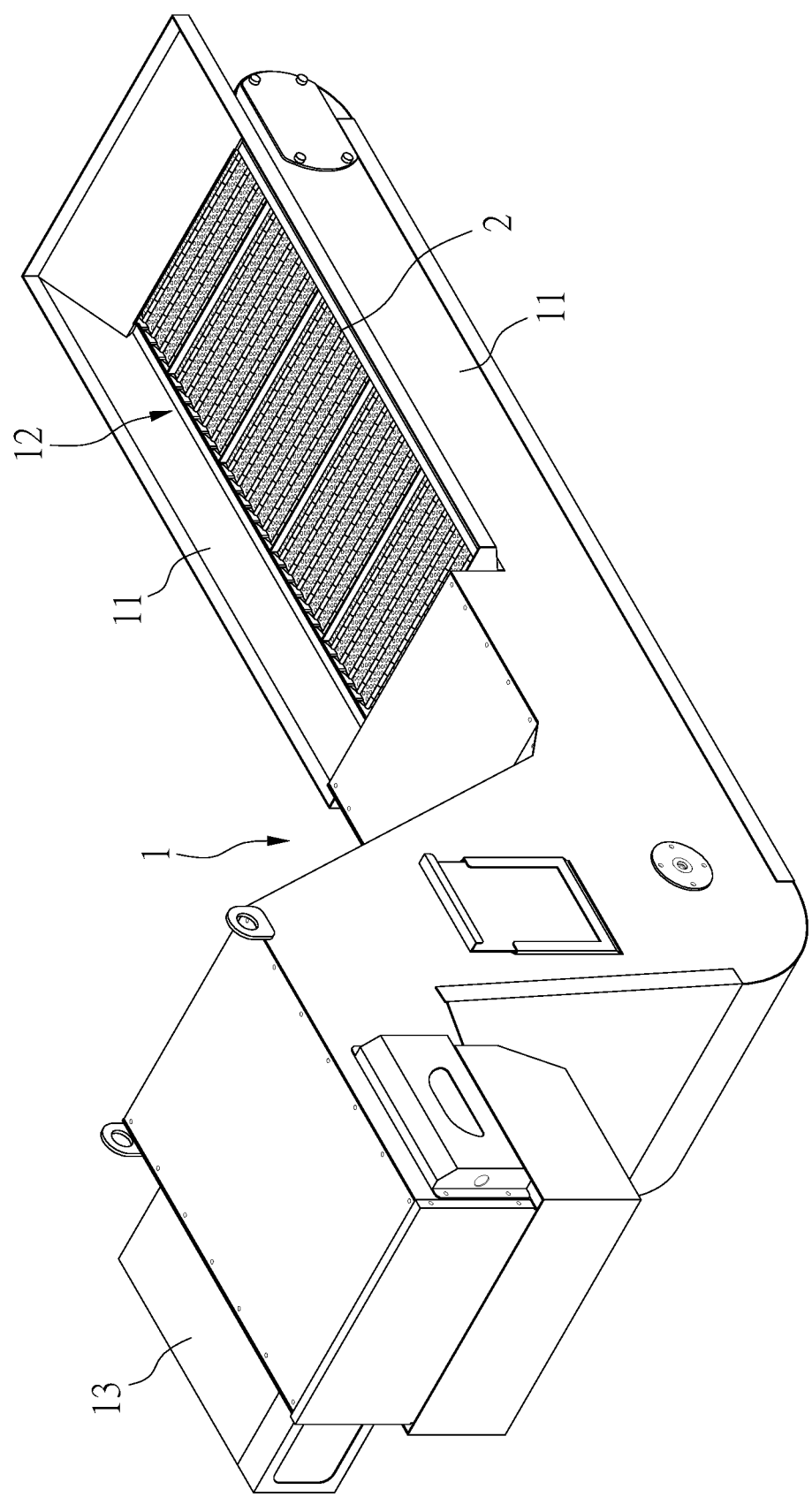
FIG. 1 is a perspective view in accordance with a first embodiment of the present invention.
Figure 2:
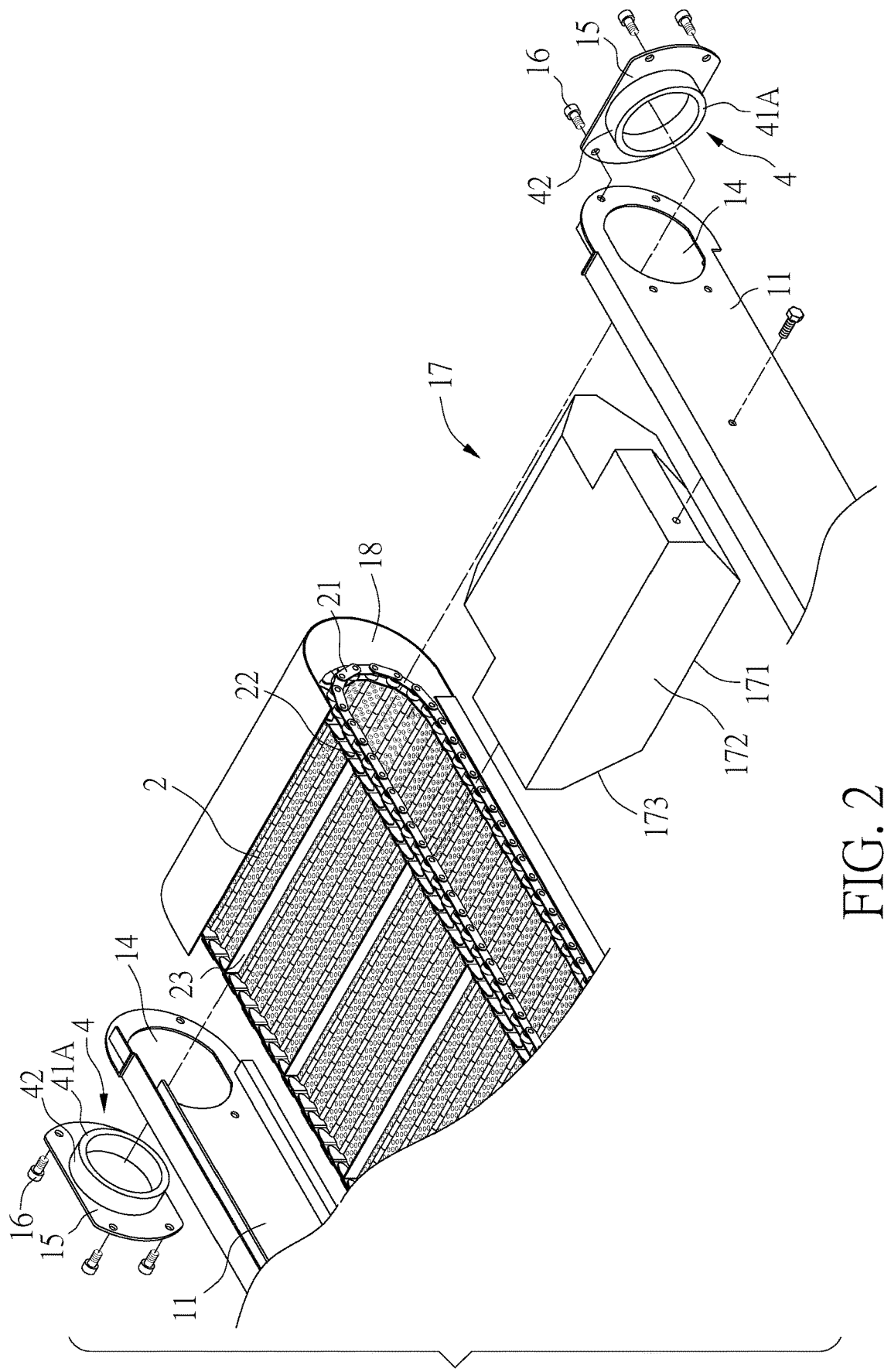
FIG. 2 is an exploded view of the rear portion of the machine body in accordance with the first embodiment of the present invention.
Figure 3:
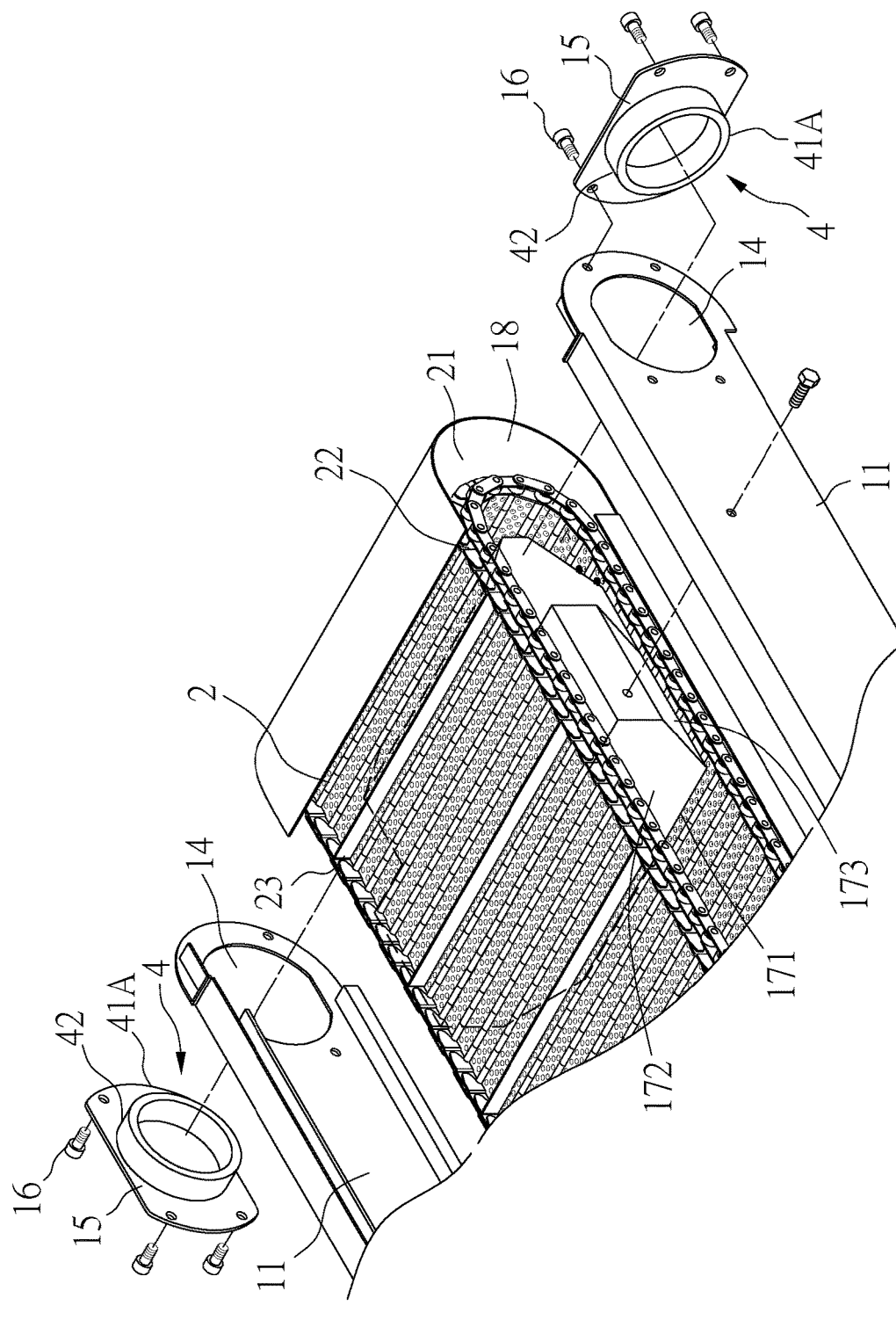
FIG. 3 is another exploded view of the rear portion of the machine body in accordance with the first embodiment of the present invention, for showing a guiding block is arranged in an inner space.

Referring to FIGS. 1, 2 and 3, a metal chip conveyor having an internal chip removal structure in accordance with a first embodiment of the present invention comprises a machine body 1. The left and right sides of the main body 1 are provided with casings 11. An accommodating room 12 is enclosed by the casings 11. A conveyor belt 2 is disposed in the accommodating room 12. The head and tail of the conveyor belt 2 are connected to form an endless belt. The conveyor belt 2 is driven by a drive device 13 provided at the front end of the machine body 1 for conveying metal chips.

Figure 4:
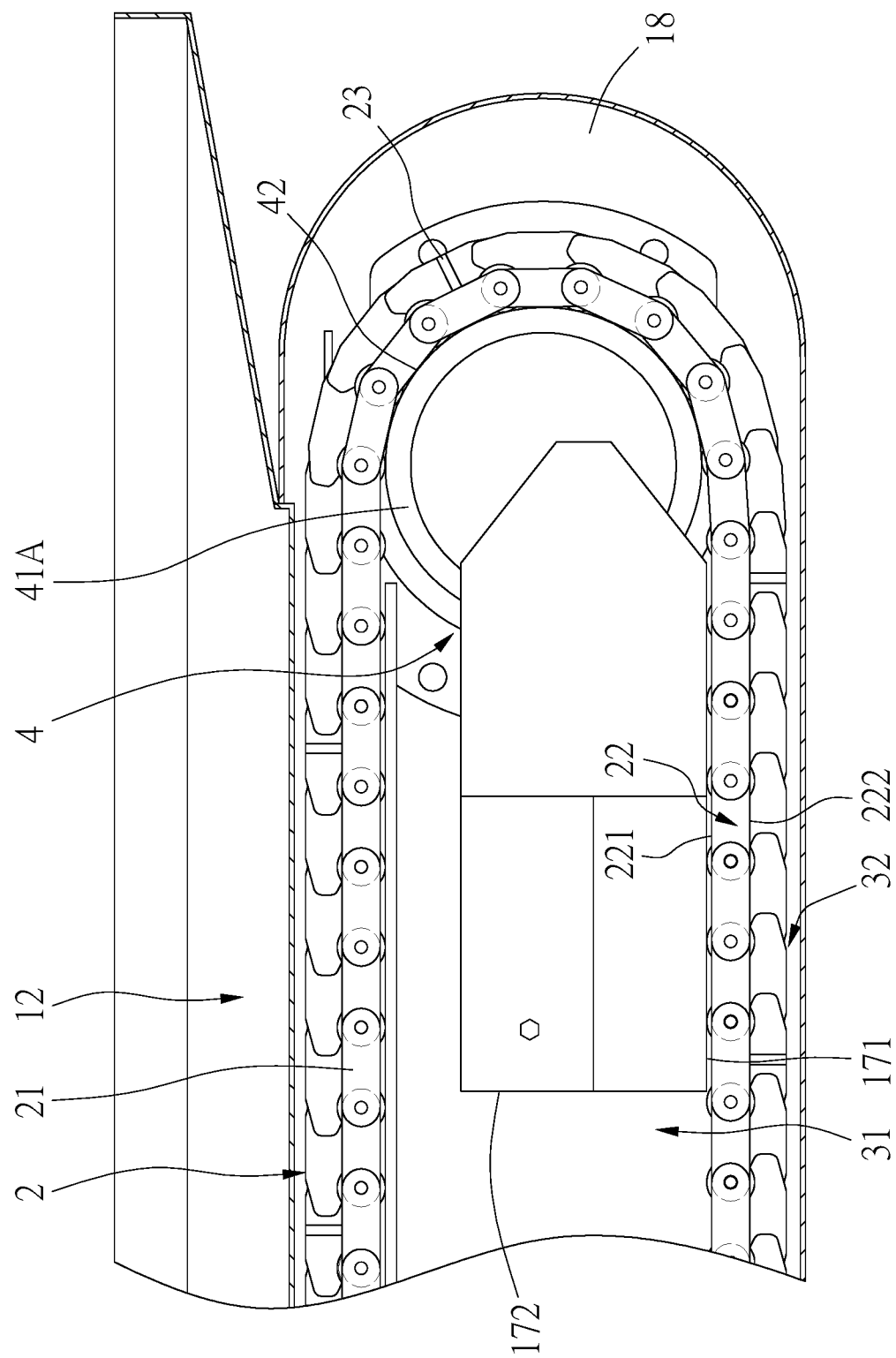
FIG. 4 is a sectional view of the rear portion of the machine body in accordance with the first embodiment of the present invention.

Two sides of the conveyor belt 2 are provided with a pair of chains 21. Wherein, each chain 21 is provided with a plurality of chain links 22 for a sprocket (not shown) of the drive device 13 to mesh with the chain links 22 to roll the conveyor belt 2. As shown in FIG. 4, an inner space 31 is enclosed by the conveyor belt 2 in the accommodating room 12, and the space outside the conveyor belt 2 is defined as an outer space 32. Wherein, the inner space 31 can communicate with the outer space 32 via the chain links 22 of the chain 21. Furthermore, each chain link 22 has a first opening 221 facing the inner space 31 and a second opening 222 facing the outer space 32, thereby communicating the inner space 31 and the outer space 32.

The rear end of the machine body is provided with two support bushes 4 for supporting the conveyor belt 2. As shown in FIGS. 2 and 3, the casings 11 at the left and right sides of the machine body 1 are provided with a pair of through holes 14 opposite to each other and corresponding to the rear end of the conveyor belt 2. Each through hole 14 is provided with a cover plate 15. The cover plate 15 is fastened to the casing 11 with screws 16 to cover the through hole 14. The cover plate 15 can be detached from the casing 11. The support bush 4 is integrally disposed on the cover plate 15. In this embodiment, the support bush 4 has a guide section 41A. The guide section 41A is a cylindrical structure, and is formed with a curved contact surface on the peripheral surface thereof. The guide section 41A extends toward the accommodating room. As shown in FIG. 4, the conveyor belt 2 passes around the two support bushes 4 and is supported on the curved contact surfaces 42 of the two guide sections 41A, so that the conveyor belt 2 can be stably and smoothly turned.

The conveyor belt 2 is supported by the guide sections 41A of the support bushes 4 so that the first openings 221 of the chain links 22 of the two chains 21, corresponding in position to the curved contact surfaces 42 of the two support bushes 4, are covered and the chain links 22 cannot communicate with the inner space 31 via the first openings 221. Furthermore, since the conveyor belt 2 continues to be rolled by the drive device, only the first openings 221 of a portion of the chain links 22 that are rolled to get contact with the curved contact surfaces 42 of the guide sections 41A of the support bushes 4 are covered.

When the chip conveyor is running, if the metal chips dropped on the conveyor belt 2 are excessive, the metal chips may enter the inner space 31 surrounded by the conveyor belt 2. According to the structure of the present invention described above, as shown in FIG. 5, the metal chips 5 in the inner space 31 can enter the chain links 22 of the chains 21 through the first openings 221. When the conveyor belt 2 is rolled and the chain links 22 with the metal chips 5 are moved to get contact with the curved contact surfaces 42 of the guide sections 41A, the first openings 221 are closed so that the metal chips fall into the outer space 32 through the second openings 222 along with the movement of the chain links 22, ensuring that the metal chips 5 in the inner space 31 can be discharged stably and won't fall back into the inner space 31 through the first openings 221. This can prevent the accumulation of the metal chips in the inner space 31 to affect the normal operation of the conveyor.

In addition, the metal chips that fall into the outer space 32 may accumulate in a block and accumulate in the outer space 32. As shown in FIGS. 2, 3, 4 and 5, the outer peripheral surface of the conveyor belt 2 is provided with a plurality of spaced crossbars 23. Each crossbar 23 extends outward toward the outer space 32. Accordingly, when the conveyor belt 2 is running, each of the crossbars 23 can be moved along with the conveyor belt 2 to push the blocky metal chips 51 up to the top surface of the conveyor belt 2 and then to be discharged to the chip outlet at the front end of the machine body.

Figure 5:
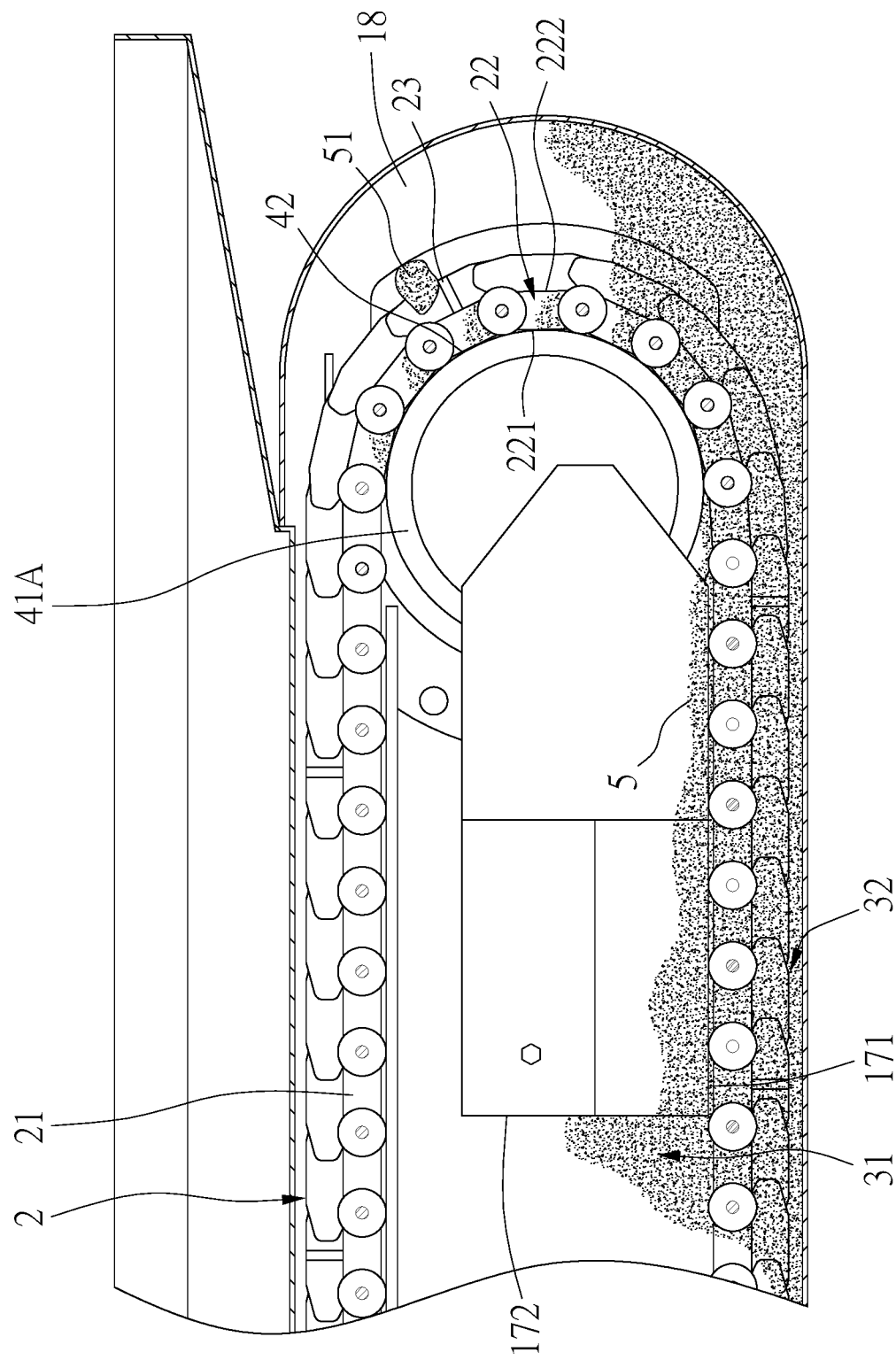
FIG. 5 is a schematic view in accordance with the first embodiment of the present invention when in use.

The support bush 4 of the present invention has the cylindrical guide portion 41A instead of the conventional sprocket. When in use, as shown in FIG. 5, the guide portion 41A does not extend into the chain links 22 so that the metal chips 5 won't be squashed and compacted and the chain links 22 won't be clogged with the metal chips 5. The metal chips 5 freely fall into the outer space 32 through the second openings 222.

Furthermore, the metal chip conveyor of the present invention can be regularly cleaned to remove the internal metal chips. As long as the cover plate 15 (together with the support bush 4) is detached, the through hole 14 of the casing 11 can be opened to provide a passage for the operator or a tool to easily enter the inner space 31 to clean up the accumulated chips, without the need to dismantle the entire casing and the conveyor belt. Therefore, the present invention can reduce the complexity of the operation and the working time and improve the efficiency.

Referring to FIGS. 1, 2, 3, 4 and 5, a guiding block 17 is connected to the casing 11. The guiding block 17 is arranged in the inner space 31. The guiding block 17 has a bottom surface 171, a blocking face 172, and a guiding gap 173. The bottom surface 171 faces to the conveyor belt 2. The guiding gap 173 lies at one side of the blocking face 172 and communicates with the chain links 22. The blocking face 172 is vertical to the bottom surface 171. At least one corner of the guiding block 17 is inclined sliced off for forming the guiding gap 173. The bottom surface 171 is closely bordered to the conveyor belt 2 so as to reduce a gap between the bottom surface 171 and conveyor belt 2, prevent metal chips 5 from easily accumulating in the gap. Therefore, when the conveyor belt 2 is propelled, the metal chips 5 are stopped by the blocking face 172 and are moved to the guiding gap 173, then enter into the chain links 22. After the chain links 22 contacts against the curved contact surface 42, the metal chips 5 are pressed by the curved contact surface 42 and are dropped to the outer space 32, efficiently prevent metal chips 5 from accumulating in the inner space 31.

Furthermore, a rear end of the casing 11 furtherly extends a gathering space 18 communicating with the outer space 32, aims to increase the capacity of the casing 11 for storing the metal chips 5.

Figure 6:
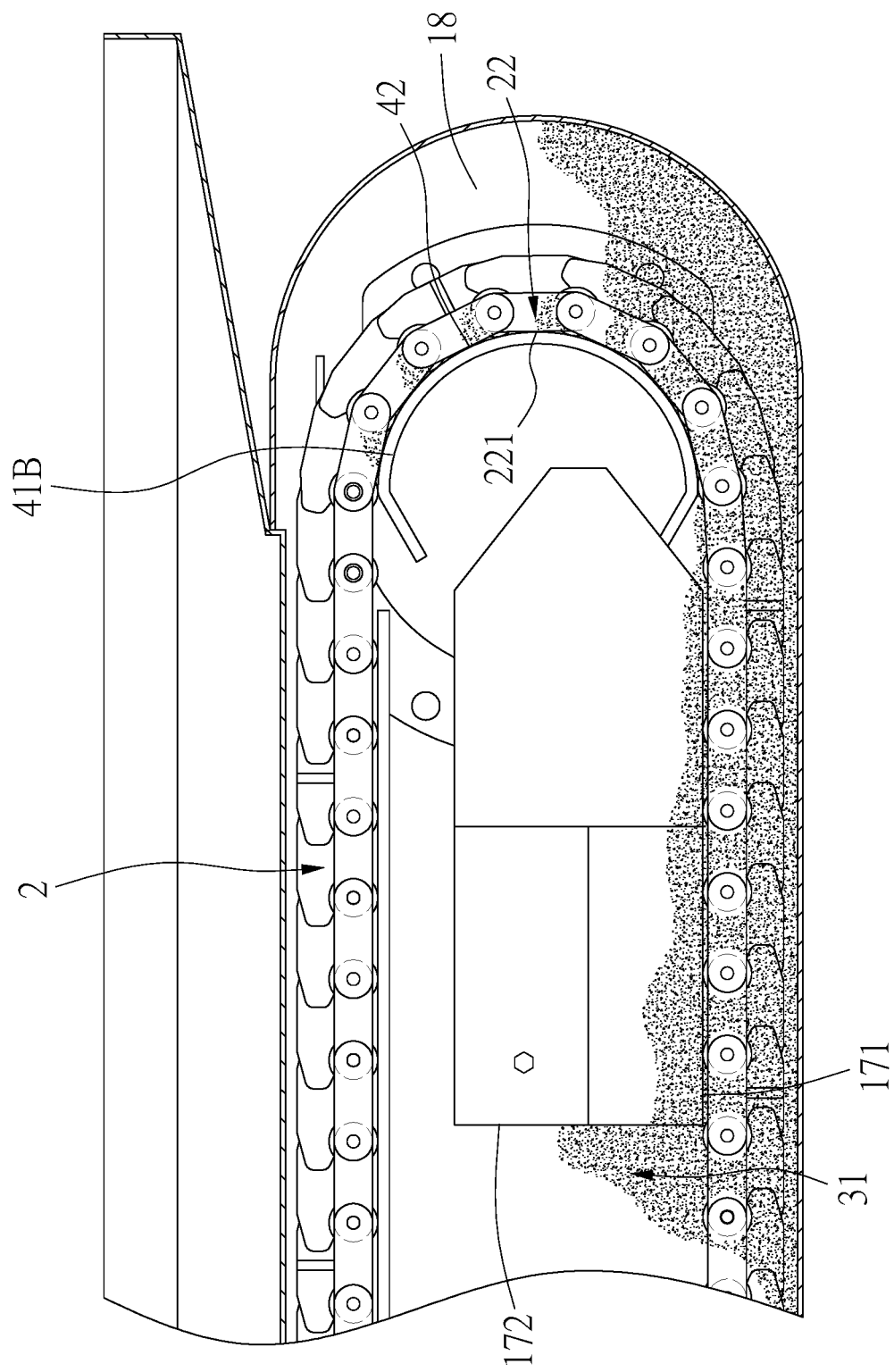
FIG. 6 is a sectional view of the rear portion of the machine body in accordance with a second embodiment of the present invention.

FIG. 6 shows the second embodiment of the present invention. The difference between the second embodiment and the first embodiment lies in the shape of the guide section of the support bush. In this embodiment, the guide section 41B is formed with an arc wall surface, having an arc length with a central angle of at least 180 degrees. The curved contact surface 42 is formed on the outer circumferential surface of the guide section 41B. Accordingly, the conveyor belt 2 is supported on the guide section 41B, and the curved contact surface 42 covers the first openings 221 of the chain links 22 at the corresponding position to prevent the metal chips from falling back into the inner space 31.

Figure 7:
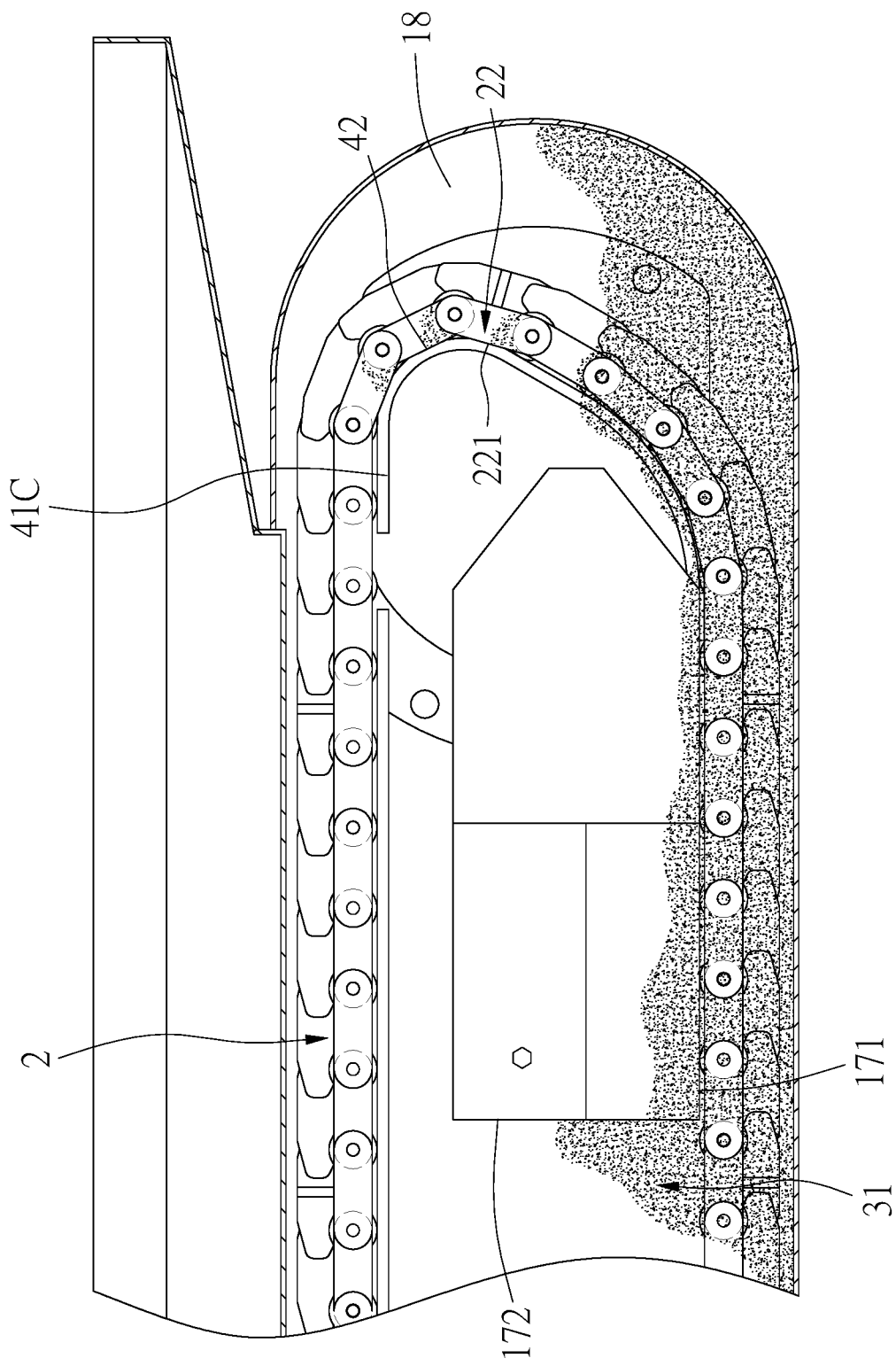
FIG. 7 is a sectional view of the rear portion of the machine body in accordance with a third embodiment of the present invention.
Figure 8:
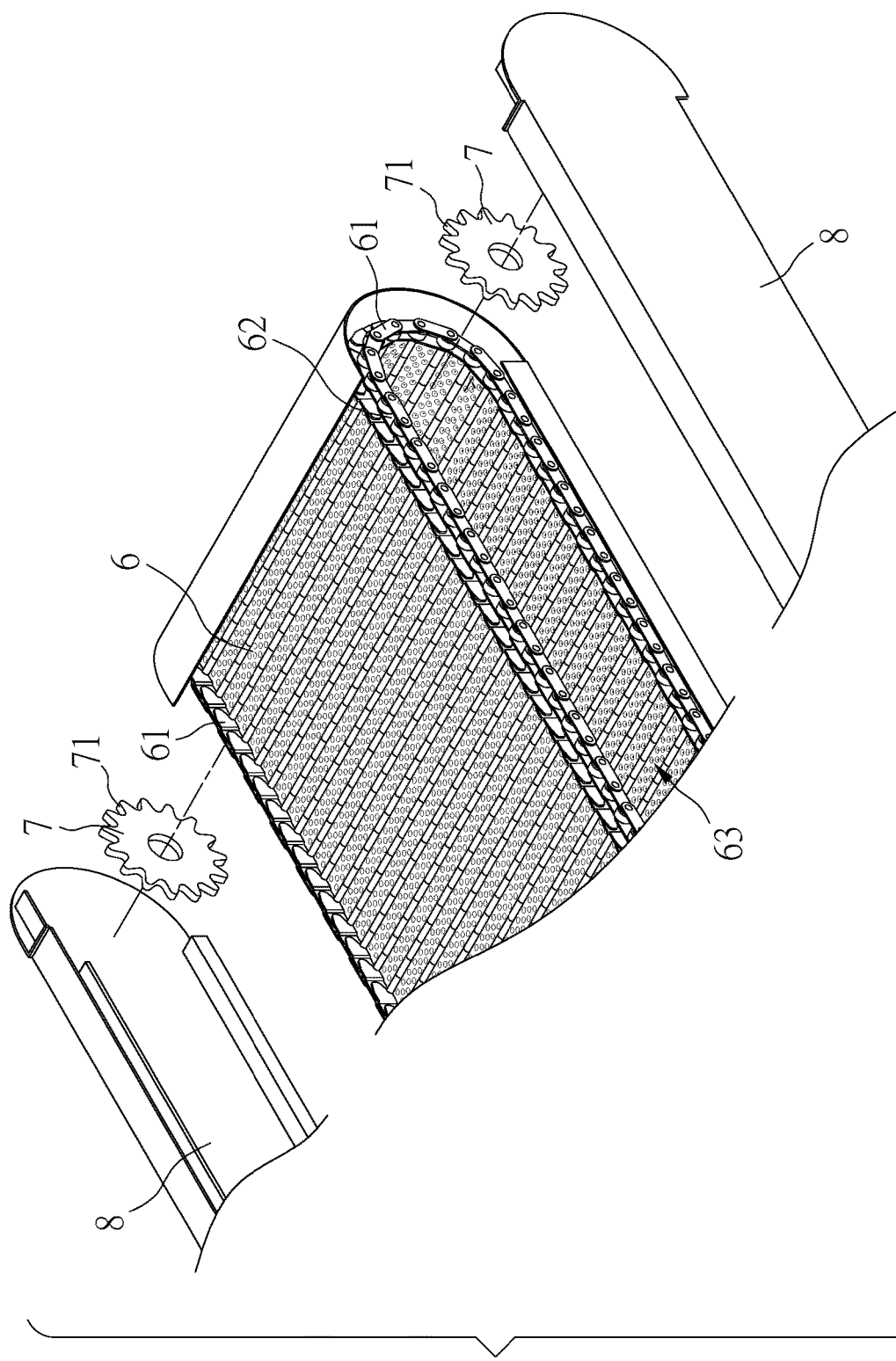
FIG. 8 is a schematic view of a conventional metal chip conveyor.

FIG. 7 shows a third embodiment of the present invention. The difference between the third embodiment and the first embodiment lies in the shape of the guide section of the support bush. In this embodiment, the guide section 41C is formed with an ear-like wall surface. The curved contact surface 42 is formed on the outer circumferential surface of the guide section 41C. Accordingly, the conveyor belt 2 is supported on the guide section 41C, and the curved contact surface 42 covers the first openings 221 of the chain links 22 at the corresponding position to prevent the metal chips from falling back into the inner space 31.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A metal chip conveyor having an internal chip removal structure, comprising:
    a machine body, having a casing, an accommodating room being enclosed by the casing;
    an endless conveyor belt, disposed in the accommodating room and driven by a drive device; the accommodating room defining an inner space enclosed by the conveyor belt and an outer space outside the conveyor belt; two sides of the conveyor belt being provided with a pair of chains each having a plurality of chain links, the chain links each having a first opening facing the inner space and a second opening facing the outer space;
    two support bushes, disposed at opposite sides of the casing and extending toward the accommodating room; the conveyor belt passing around the two support bushes and being supported by the two support bushes, the support bushes covering the first openings of the chain links corresponding in position to the support bushes when the conveyor belt is running; and
    a guiding block, arranged in the inner space, the guiding block having a bottom surface, a blocking face and a guiding gap, the bottom surface faced to the conveyor belt, the guiding gap lied at least one side of the blocking face and communicated with the chain links.

2. The metal chip conveyor as claimed in claim 1, wherein the opposite sides of the casing are provided with two detachable cover plates, and the two support bushes are disposed on the two cover plates, respectively.

3. The metal chip conveyor as claimed in claim 1, wherein the support bushes each has a guide section to hold against the conveyor belt, and the guide section covers the first openings of the chain links corresponding in position to the guide section.

4. The metal chip conveyor as claimed in claim 3, wherein the guide section has a curved contact surface to hold against the conveyor belt.

5. The metal chip conveyor as claimed in claim 1, wherein the conveyor belt is provided with a plurality of spaced crossbars extending outward toward the outer space.

6. The metal chip conveyor as claimed in claim 1, wherein at least one end of the guiding block is connected to the casing.

7. The metal chip conveyor as claimed in claim 1, wherein the blocking face is vertical to the bottom surface.

8. The metal chip conveyor as claimed in claim 1, wherein at least one corner of the guiding block is inclined sliced off for forming the guiding gap.

9. The metal chip conveyor as claimed in claim 1, wherein the bottom surface is closely bordered to the conveyor belt.

10. The metal chip conveyor as claimed in claim 1, wherein a rear end of the casing extends a gathering space communicating with the outer space.

* * * * *